United States Patent
Huke et al.

(10) Patent No.: US 11,348,411 B2
(45) Date of Patent: May 31, 2022

(54) GAMING DURING BREAKS IN LIVE SPORTING EVENTS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/083,790

(22) Filed: Oct. 29, 2020

(65) Prior Publication Data

US 2022/0122422 A1   Apr. 21, 2022

Related U.S. Application Data

(60) Provisional application No. 63/092,637, filed on Oct. 16, 2020.

(51) Int. Cl.
*G07F 17/32* (2006.01)
(52) U.S. Cl.
CPC ...... *G07F 17/3288* (2013.01); *G07F 17/3223* (2013.01)
(58) Field of Classification Search
CPC ............ G07F 17/3288; G07F 17/3223
See application file for complete search history.

(56) References Cited

U.S. PATENT DOCUMENTS

| 10,460,568 | B2 | 10/2019 | Givant |
| 11,217,063 | B2* | 1/2022 | Lutnick .................. G07F 17/32 |
| 2006/0089194 | A1* | 4/2006 | Joshi .................. G07F 17/3255 463/25 |
| 2020/0168049 | A1* | 5/2020 | Nelson ............... G07F 17/3288 |

FOREIGN PATENT DOCUMENTS

| EP | 3 188 143 A1 | 7/2017 |
| WO | 2019/115737 A1 | 6/2019 |

OTHER PUBLICATIONS

Notification of Transmittal of the International Search Report and the Written Opinion of the International Searching Authority, or the Declaration dated Oct. 21, 2021, in connection with corresponding International Application No. PCT/US2021/052845; 7 pages.

* cited by examiner

*Primary Examiner* — Corbett B Coburn
(74) *Attorney, Agent, or Firm* — Maier & Maier, PLLC (57) ABSTRACT

A method of offering casino games to users of a play by play wagering network. The play by play wagering network will offer wagers on individual plays inside of a live sporting event and monitors that live sporting event for breaks in the action. The wagering network then offers the user a casino game, such as roulette or poker, based on at least one characteristics of at least one of the user's previous wagers.

16 Claims, 3 Drawing Sheets base wagering module Object Content

Fig.1 Content - High Level Diagram

Fig.2 base wagering module Object Content

Fig.3 wagering module Object Content

Fig.4 casino games module Object Content

GAMING DURING BREAKS IN LIVE SPORTING EVENTS

FIELD

The embodiments are generally related to wagering on live sporting events, such as engaging users during breaks in the action of a live sporting event.

BACKGROUND

Current sports betting platforms lack a way of driving user engagement and do not offer a way to encourage users to continue to place wagers through a live event.

Users who wager on sports are likely to be a user who would engage in other forms of gaming.

With such a wide variety of casino games, it is difficult for a provider to know which casino games are likely to engage a given user.

SUMMARY

The embodiments can include methods, systems and apparatuses for providing games to players of a single play wagering platform during breaks in action of sporting events which are being wagered on. One embodiment includes a method of delivering casino games inside of a play by play wagering game, including receiving data from a live sporting event upon which single play wagers can be played on plays inside of that live sporting event, receiving at least one wager from at least one user, monitoring the live sporting event for a break in action of the live sporting event, determining that there is a break in the action of the live sporting event, and providing at least one casino game during the break in action where the at least one casino game is selected based upon at least one characteristic of at least one wager made.

Another exemplary embodiment includes a method of providing game play inside of a play by play wagering platform, including executing on a processor the steps of displaying a wagering game on a wagering platform; displaying one or more real time wagers based on one or more live sporting events; displaying that a break in action of the one or more live sporting events has occurred; and displaying one or more casino game options triggered as a result of the break in action of the one or more live sporting events.

Still another exemplary embodiment includes a method of providing games inside of a play by play wagering game, including receiving data from a live sporting event upon which single play wagers can be played on plays inside of that live sporting event, receiving at least one wager from at least one user, monitoring the live sporting event for a break in action of the live sporting event, determining that there is a break in the action of the live sporting event, and providing at least one game during the break in action where the at least one game is selected based upon at least one characteristic of at least one wager made.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (5) track and report on player behaviors. A managed service user interface can be integrated into the embodiments in a variety of manners.

Managed service risk management services is a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means.

State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners. Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
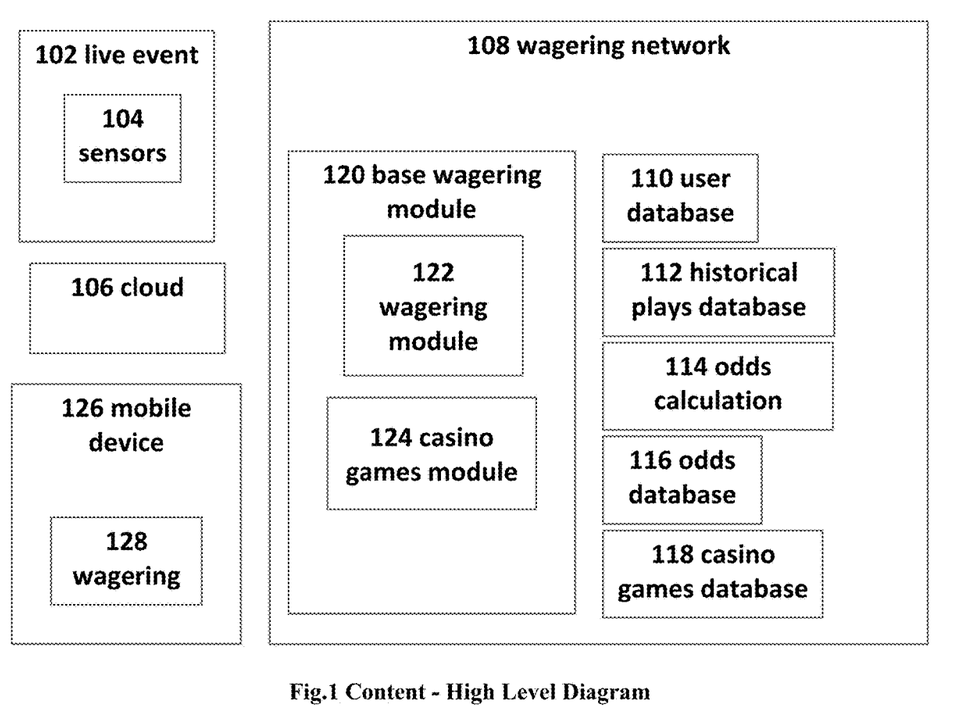
FIG. 1 illustrates casino gaming during breaks in live sporting event, according to an embodiment.

FIG. 1 is a system for casino gaming during breaks in live sporting event. This system comprises of a live event 102, for example, a sporting event such as a football game, a basketball game, a hockey game, a tennis match, golf tournament, eSports or digital game, etc. The live event 102 will include some number of actions or plays, upon which a user, bettor or customer can place a bet or wager, typically through an entity called a sportsbook. There are numerous types of wagers the bettor can make, including a straight bet, a money line bet, a bet with a point spread or line that bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round-robin, or other styles of tournaments. There are other types of wagers, including parlays, teasers and prop bets that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such an injury to an important player such as a listed pitcher, in which a sportsbook, casino or racino will take an available wager off the board. As the line moves there becomes an opportunity for a bettor to bet on both sides at different point spreads to middle and win both bets. Sportsbooks will often offer bets on portions of games, such as first half bets and half-time bets. Additionally, the sportsbook can offer futures bets on live events 102 in the future. Sportsbooks need to offer payment processing services to cash out customers. This can be done at kiosks at the live event 102 or another location. For example, considering a live event 102 may be a baseball game that is played between the New York Yankees and the Los Angeles Dodgers, at Yankee Stadium, New York City.

Further, embodiments may include a plurality of sensors 104 that may be used such as motion sensors, temperature sensors, humidity sensors, cameras such as an RGB-D camera which is a digital camera capturing color (RGB) and depth information for every pixel in an image, microphones, a radiofrequency receiver, a thermal imager, a radar device, a LIDAR device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that collects statistical information through real-time X, Y positioning of players and X, Y, Z positioning of the ball. In the example of a baseball game, the plurality of sensors 104 may be used for capturing parameters such as spin rate of the ball, speed of the ball, ball positions, launch angle, and exit velocity.

Further, embodiments may include a cloud 106 or communication network may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable resources and higher-level services that can be rapidly provisioned with minimal management effort, often over internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to the wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other embodiments, the cloud 106 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein.

Further, embodiments may include the wagering network 108 which may perform real-time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other embodiments, the wagering network 108 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein. The wagering network 108 can offer a number of software as a service managed services such as, user interface service, risk management service, compliance, pricing and trading service, IT support of the technology platform, business applications, game configuration, state-based integration, integration to allow the joining of social media, as well as marketing support services that can create engaging promotions to the user. In one embodiment, the wagering network 108 may facilitate the user with settlement options related to the wager. In another embodiment, the wagering network 108 may use third party balance settlement apps linked to a wagering app 128, for settlement of the balances of the user. For example, the wagering app 128 may use Paypal for settlement of the balances of the user.

Further, embodiments may utilize a user database 110 which contains data relevant to all users of the wagering network 108, which may include, a user ID, a device identifier, a paired device identifier, wagering history, and account balance i.e. wallet information for the user. The user database 110 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 110 may contain betting lines and search queries. The user database 110 may be searched based on a search criteria received from the user. Each betting line may include a plurality of betting attributes such as at least one of the live event 102, a team, a player, an amount of wager, etc. The user database 110 may include information related to all the users involved in the live event 102. In one example embodiment, the user database 110 may include information for generating a user authenticity report and a wagering verification report. Further, the user database 110 may be used to store user statistics like, but not limiting to, retention period for a particular user, frequency of wagers placed by a particular user, details of previous in-play wager placed by a particular user, average amount of wager placed by each user, etc. Further, the user database 110 may also contain information related to casino games played by the user, result of the previously played casino games, etc.

Further, embodiments may utilize a historical plays database 112 that contains play data for the type of sport being played in the live event 102. In one embodiment, for optimal odds calculation, the historical play data may include metadata about the historical plays, such as time of the live event 102, location, weather, previous plays, opponent, physiological data of the players (including blood pressure, pulse rate, and respiration rate), batting average of all players, information related to the players such as injuries in the past, batting average, earned run average, catch probability, spin rate, launch angle, exit velocity, information related to trainers of each player, etc. For example, in the baseball game, information stored in the historical plays database 112 may include information related to the previous baseball games played by the New York Yankees such as, but not limited to, the weather condition, i.e. during the match, it was cloudy.

Further, embodiments may include an odds calculation module 114 which utilizes information from the historical plays database 112 and the information from the sensor feeds 104 to calculate odds for in-play wagers. The information from the historical plays database 112 may include data related to the type of the play, the previous information related to players involved in the live event 102, and results of the previous live events 102. The odds for each live event 102, such as in a baseball game, a particular player hitting a home run, a single, or a strikeout, may be calculated based on the information received from the sensor feeds 104 and the previous information related to the particular player. Further, the odds may be updated based on in-game events (for example, a player strikes a home run with the same pitcher, decreasing his odds of getting a strikeout from the same pitcher). The odds may be calculated or adjusted based on statistical information related to the live event 102 and the statistical information of the players. For example, the odds may be determined based on the historical data such as prior performance information about a player (like batting average against a certain pitcher, earned run average, catch probability, hamstring strain), and physiological information of player(s) etc., and current i.e. real-time information, such as current confidence level etc. In one embodiment, the type of wagering may depend on the type of game being played.

In one embodiment, the odds calculation module 114 may determine the available wagers to the user. The odds calculation module 114 may also utilize a probability engine, which assembles all the historical data and real-time data and produces the odds (stored in the odds database 116) for in-play wagers. Thus, the odds calculation module 114 may contain information relevant to all the potential outcomes, as available wagers, which facilitates the user with a better knowledge to make certain judgements about the potential performance of players in each live event 102 and place a calculated wager with a potential return on the wager. For example, in the baseball game, the odds calculation module 114 may calculate odds related to the possible outcomes of an at-bat for Aaron Judge of the New York Yankees hitting against Clayton Kershaw of the LA Dodgers, such that the odds of hitting a single are 4/1 (in moneyline +400), hitting a double are 5/1, hitting a home run are 3/1, and a strikeout are 2/1.

Further, embodiments may utilize an odds database 116 that contains the odds calculated by the odds calculation module 114. The odds database 116 stores all the odds and may be used by a base wagering module 120 to facilitate the user with wagering opportunities, through the wagering app 128. In one embodiment, the type of wagering may depend on the type of game being played.

Further, embodiments may utilize a casino games database 118 that contains play data for casino games, or other playable games, that can be offered to the user, when the live event 102 is inactive or during a break of the live event 102. The casino games may be, but are not limited to, digital poker, slots, craps, blackjack, roulette, or baccarat. Alternatively, in other embodiments, the casino games may be any playable games, regardless of whether or not they are wagering games or traditional casino games, such as arcade games, video games, and the like. Further, the casino games database 118 may store casino games that can be offered to a particular user, based on different user characteristics or predefined thresholds of previous in-play wagers placed by the user and may be used by the casino games module 124 to allow the user to play a casino game, via the app. In one embodiment, the user characteristics may include user's historical data such as the user's previous in-play wager, the user's wager frequency, number of times the user has played a particular game, time spent on each casino game, wager size, time since last play, user's browsing history, result of the user's previous in-play wager, etc. In one embodiment, the casino games database 118 may store predefined thresholds of the wager size. For example, in one case, if the predefined threshold is $20 and the wager size of the user is less than $20, then the casino games database 118 may store a corresponding game of slots. In another case, if the wager size of the user is more than $20, then the casino games database 118 may store a corresponding game of digital poker. In another embodiment, the casino games database 118 may store casino games based on the last wager placed by the user. For example, in one case, if the previous in-play wager was placed recently, then the casino games database 118 may store a corresponding game of blackjack. In another case, if the previous in-play wager was not placed within a predefined time before the start of break, then the casino games database 118 may store a corresponding game of digital poker. In another embodiment, the casino games database 118 may store casino games based on the user's wager frequency. For example, if the user has placed more than 10 wagers in last one hour, then the casino games database 118 may store a corresponding game of roulette and if the user has placed less than 10 wagers in the last one hour, then the casino games database 118 may store a corresponding game of digital poker. In yet another embodiment, the casino games database 118 may store casino games to be offered to a particular user, based on the result of the user's previous wager. For example, in one case, if the user has won the previous wager, then the casino games database 118 may store a game of slots for the user. In another case, if the user has lost the previous wager, then the casino games database 118 may store a corresponding game of blackjack. In another example embodiment, the casino games database 118 may store casino games to be offered to a particular user, based on the casino games played in the past or casino games that the user has shown interest in the past.

Further, embodiments may include the base wagering module 120 that allows the user to place in-play wagers. The base wagering module 120 may allow the user to log-in/sign-in to the wagering network 108 through the wagering app 128 on a mobile device 126, during the live event 102. After logging in to the wagering app 128, the base wagering module 120 may receive data related to the live event 102. In one embodiment, the data related to the live event 102, may be received from the sensors 104. For example, the base wagering module 120 receives data that in the baseball game, Aaron Judge of the New York Yankees, playing the 3rd inning against Clayton Kershaw of the LA Dodgers. Further, the base wagering module 120 may retrieve all available wagers related to the live event 102, from the odds database 116. For example, the available wagers include a wager of $100 on Aaron Judge of the New York Yankees, playing the 3rd inning against Clayton Kershaw of the LA dodgers, hitting a single at odds of 4/1 and a wager of $400 on Aaron Judge of the New York Yankees, playing the 3rd inning against Clayton Kershaw of the LA Dodgers, hitting a homerun at odds of 5/1. Further, the base wagering module 120 may check for wager selection. In one case, if the wager is selected by a user, then the base wagering module 120 may trigger a wagering module 122. For example, the user selects a wager of $100 on Aaron Judge of the New York Yankees, playing the 3rd inning against Clayton Kershaw of the LA Dodgers, hitting a single. In another case, if no wager is selected by the user, then the base wagering module 120 may determine if the live event 102 is still active i.e. if there is a commercial or other break during the live event 102. In one embodiment, the break may be an injury break, review break, or innings break. In one case, if the live event 102 is still active, then the base wagering module 120 may continue retrieving the available wagers. In another case, if the live event 102 is not active, then the base wagering module 120 may trigger the casino games module 124 to facilitate the user to play casino games. Thereafter, the base wagering module 120 may constantly monitor if the live event 102 is concluded or if the user logs-off from the app i.e. wagering app 128, during the live event 102.

Further, embodiments may include a wagering module 122 which is triggered when a wager is placed by the user in the live event 102, via the base wagering module 120. After receiving the prompt from the base wagering module 120, the wagering module 122 may receive an input from the user. The input may correspond to a wager placed by the user. For example, the user places a wager of $100 on Aaron Judge of the New York Yankees, playing the 3rd inning against Clayton Kershaw of the LA Dodgers, hitting a single. Further, the wagering module 122 may compare the result of the live event 102 with the wagers placed by the user, to determine a result i.e. whether the user has won or lost the wager. Based on the comparison of the result of the live event 102 and the wagers placed by the user, the result of the wager may be used to calculate the balance amount for the user. For example, the result of the live event 102 is Aaron Judge hits a single and the wager of $100 on Aaron Judge hitting a single, are compared to determine the result of the wager i.e. a win for the user. In this example, the user would make a profit of $400, as per the initial wager ($100) placed at odds of 4/1. Thus, the updated balance of the user (with an opening balance of $2000), after the completion of the live event 102, will be $2000+$400=$2400. Further, the updated balance of $2400 of the user may be updated in the user database 110. Further, the wagering module 122 monitors the live event 102, until a predefined condition is met. In one exemplary embodiment, the predefined condition may be that the user has logged out of the live event 102 or the live event 102 has ended. In addition, at the end of the live event 102, the user may be prompted with a message reminder for a next live event, as a recommendation.

Further, embodiments may include the casino games module 124, which allows a user to play a casino game. It may be appreciated that, in some embodiments, the casino games module 124 may be referred to as a games module 124, as the games may be any type of game (such as video games or arcade games), and are not limited to casino games. The casino games module 124 may receive a prompt from the base wagering module 120, to suggest/launch a casino game(s) from a number of casino games when the live event 102 is not active i.e. during a commercial or other breaks in action during the live event 102. In one embodiment, the break may be injury break, review break, or innings break. The casino games module 124 may utilize information from the user database 110 and the casino games database 118 to identify wager details such as, but not limited to, threshold value of the wager size, previous in-play wager, wager frequency, number of times the user has played a particular game, time spent on each game, time since last game was played, etc. Further, the casino games module 124 may determine which casino game(s) to launch for the user. In one embodiment, the determination of which casino game to launch for the user, may be based at least on the wager size, wager frequency, last wager, or result of user's previous wager, timing of the previous in-play wager placed by the user. In one embodiment, the casino games module 124 may launch a particular game, based on a predefined threshold of the wager size. For example, in one case, if the predefined threshold is $20 and the wager size of the user is less than $20, then the casino games module 124 may offer slots to the user. In another case, if the wager size of the user is more than $20, then the casino games module 124 may offer digital poker to the user. In another embodiment, the casino games module 124 may launch a particular game, based on the last wager placed by the user. For example, in one case, if the previous in-play wager was placed recently, then the casino games module 124 may offer blackjack to the user. In another case, if the previous in-play wager was not placed within a predefined time before the start of break, then the casino games module 124 may offer digital poker to the user. In another embodiment, the casino games module 124 may launch a particular game, based on the user's wager frequency. For example, if the user has placed more than 10 wagers in last one hour, then roulette may be launched. In another case, if the user has placed less than 10 wagers in the last one hour, then the digital poker may be launched. In yet another embodiment, the casino games module 124 may launch a particular game, based on the result of user's previous wager. For example, in one case, if the user has won the previous wager, then a game of slots may be launched. In another case, if the user has lost the previous wager, then a game of blackjack may be launched. In this example, when the wager size of $100 is identified, then a game of digital poker is determined to be launched for the user. In another embodiment, the casino games module 124 may launch a particular casino game based on a playing position of the player, on which the user has placed the wager. For example, the casino games module 124 may offer slots, if the user has placed a wager on a player i.e. on defense. In another embodiment, the casino games module 124 may suggest a particular casino game, instead of directly launching the casino game. In one example embodiment, the casino games module 124 may suggest a suite of casino games to the user, so that the user can choose a particular casino game from the suite of games. In one embodiment, the casino games module 124 may use artificial intelligence to suggest the casino games to the user. For example, based on the wager of $100 placed by the user, the casino games module 124 may suggest blackjack and/or digital poker to the user. Based on the determined casino game to be launched/suggested for the user, the casino games module 124 may start the selected game on the wagering app 128. Further, the casino games module 124 may receive a result of the casino game. The result of the casino game may be the user has won or lost or had a tie (in case of a multiplayer game). For example, the casino games module 124 starts the game of digital poker on the wagering app 128 and the result of the digital poker is that the user wins the hand of the pot size of $500 when the user placed an ante of $10 and further raised the bet by $40. Based on the result of the casino game, the balance amount may be calculated for the user. For example, the user wins the pot size of $500 played with an ante of $10 and total bet of $50. Thus, the updated balance of the user (with an opening balance of $2400), after the completion of the casino game(s), will be $2400-$50+$500=$2850. Further, the casino games module 124 will update the account balance of the user who places the wager in the user database 110. In this example, after winning the pot size of $500 played with an ante of $10 and total bet of $50, the updated balance of the user is $2850. Further, the casino games module 124 may constantly monitor if the live event 102 resumes. In one case, when the live event 102 is not resumed, then the casino games module 124 may facilitate the user to continue playing casino games. In another case, when the live event 102 is resumed, then the user may be notified and may have an option to exit the casino game, to return to the live event 102 or continue playing the casino game. In one embodiment, when the user exits the casino game to return to the live event 102, then the user's wager may stand void and thereafter, the base wagering module 120 may be triggered. In another embodiment, if the live event 102 restarts in between the duration of the casino game, then the user may either choose to exit the casino game or to save the casino game play. It can be noted that the user may be able to save the progress of the casino game, based on the type of casino game.

Further, embodiments may include the mobile device 126 such as a computing device, laptop, smartphone, tablet, computer, smart speaker, or I/O devices. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional mobile devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also allow storage and/or an installation medium for the computing device. In still other embodiments, the computing device may allow USB connections to receive handheld USB storage devices. In further embodiments, an I/O device may be a bridge between a system bus and an external communication bus, e.g. a USB bus, a SCSI bus, a FireWire bus, an Ethernet bus, a Gigabit Ethernet bus, a Fiber Channel bus, or a Thunderbolt bus. Further, the mobile device 126 could be an optional component and would be utilized in a situation in which the paired wearable device is utilizing the mobile device 126 as additional memory or computing power or connection to the internet.

Further, embodiments may include the wagering app 128 which allows the user to place in-play wagers during the live event 102. In one embodiment, the wagering app 128 may be a mobile application or web application, which runs on the mobile device 126. The wagering app 128 may allow the user to receive data related to the live event 102. For example, in the baseball game, Aaron Judge of the New York Yankees, playing the 3rd inning against Clayton Kershaw of LA Dodgers. In one embodiment, the wagering app 128 may present the user with the wagers available, related to a particular live event 102. Further, the wagering app 128 may allow the user to place in-play wagers corresponding to the available wagers. In one embodiment, the wagering app 128 may facilitate the user with an interface i.e. a graphical user interface (GUI) for performing various operations such as, but not limited to, playing casino games, linking other applications with the wagering app 128, storing user's personal details, etc. In one embodiment, the wagering app 128 may store information related to the placed wagers. In another embodiment, the wagering app 128 may facilitate the user to set reminders related to a particular live event 102. Further, when the live event 102 concludes, the wagering app 128 may facilitate settlement of balances for the user. In another embodiment, the wagering app 128 may trigger third party balance settlement apps linked to the wagering app 128, for settlement of the balances of the user. For example, the wagering app 128 may use Paypal for settlement of the balances of the user.

Figure 2:
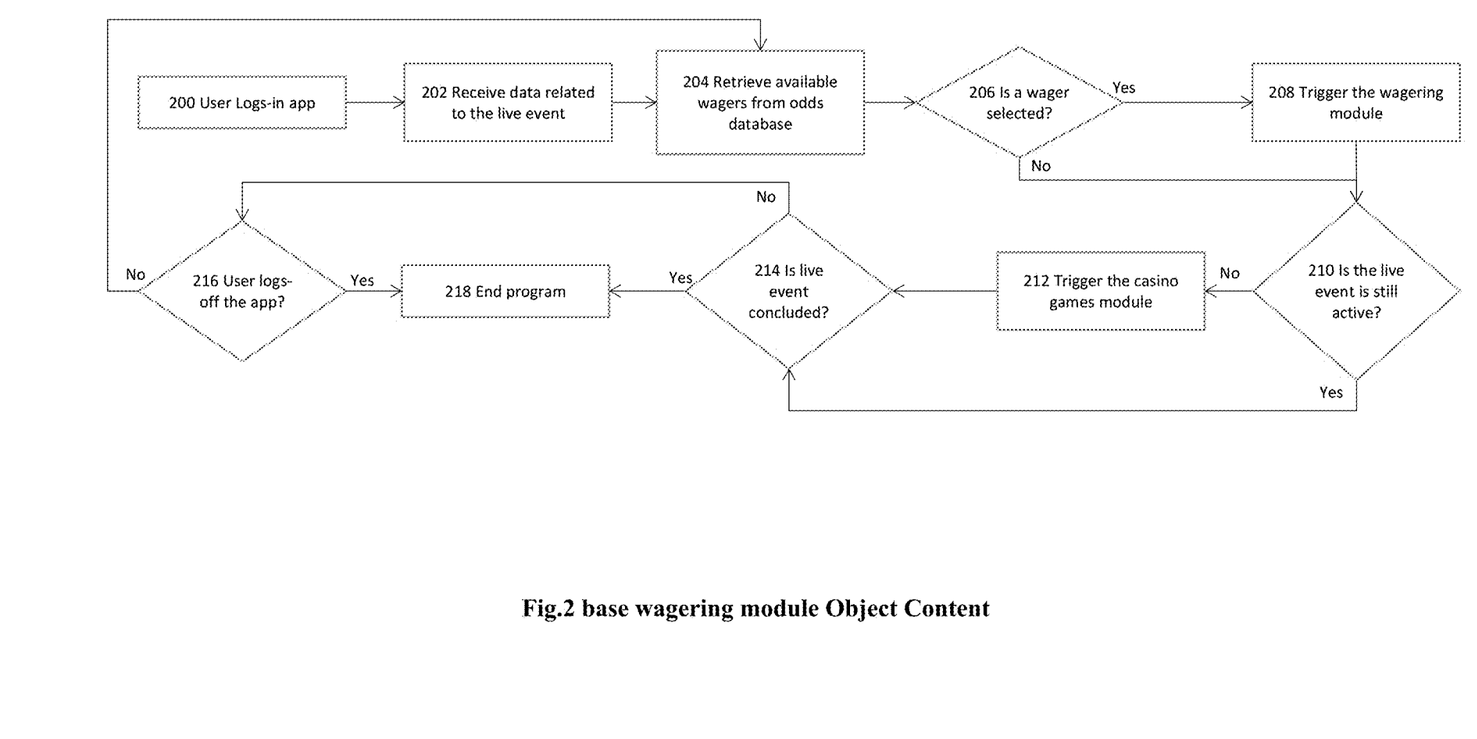
FIG. 2 illustrates a base wagering module, according to an embodiment.

FIG. 2 illustrates the base wagering module 120. The base wagering module 120 is triggered when the user logs-in, at step 200, to the wagering network 108 through the wagering app 128, on the mobile device 126. The base wagering module 120 may facilitate the user to place in-play wagers. After logging in to the wagering app 128, the base wagering module 120 may receive, at step 202, data related to the live event 102. In one embodiment, the data related to the live event 102, may be received from the sensors 104. For example, the base wagering module 120 receives data that in the baseball game, Aaron Judge of thea New York Yankees, playing the 3rd inning against Clayton Kershaw of the LA Dodgers. The base wagering module 120 may retrieve, at step 204, available wagers from the odds database 116. For example, the available wagers include a wager of $100 on Aaron Judge of the New York Yankees, playing the 3rd inning against Clayton Kershaw of LA Dodgers, hitting a single at odds of 4/1 and a wager of $400 on hitting a homerun at odds of 5/1. After retrieving the available wagers, the base wagering module 120 may determine whether the user selects, at step 206, a wager to be placed. In one case, if the user selects a wager to be placed, then the base wagering module 120 may trigger a wagering module 122. For example, the user selects a wager of $100 on Aaron Judge of the New York Yankees, playing the 3rd inning against Clayton Kershaw of the LA Dodgers, hitting a single. Based on the determination that the user selects the wager to be placed, the base wagering module 120 may trigger, at step 208, the wagering module 122. In another case, if no wager is selected by the user, at step 206, then the base wagering module 120 may determine, at step 210, if the live event 102 is still active i.e. on a commercial or other break during the live event 102. In one embodiment, the break may be an injury break, review break, or innings break. In one case, if the live event 102 is still active, then the base wagering module 120 may at step 204 retrieve the available wagers from the odds database 116. In another case, if the live event 102 is not active, then the base wagering module 120 may trigger the casino games module 124 to facilitate the user to play casino games. Based on the determination that the live event 102 is not active, then the base wagering module 120 may trigger, at step 212, the casino games module 124. The base wagering module 120 may constantly monitor, at step 214, the live event 102 for completion. In one case, when the live event 102 is concluded, then the base wagering module 120 may again trigger the wagering module 122, to conclude on the wagers placed by the user. In another case, when the live event 102 is not concluded, then the base wagering module 120 may return to, step 204, to retrieve available wagers. The base wagering module 120 may also constantly monitor, at step 216, if the user logs-off from the wagering app 128, during the live event 102. In one case, when the user logs-off from the wagering app 128, then the base wagering module 120 may again trigger the wagering module 122, to conclude on the wagers placed by the user. In another case, when the user does not logs-off from the wagering app 128, then the base wagering module 120 may return to, step 204, to retrieve available wagers. Thereafter, the program ends, at step 218.

Figure 3:
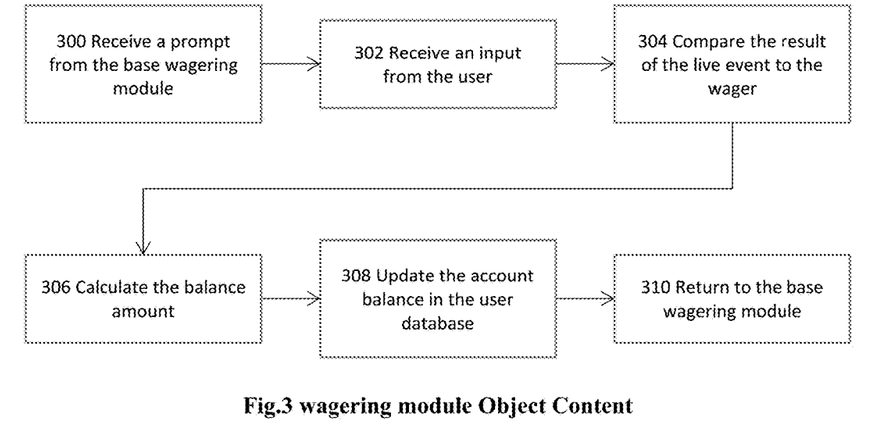
FIG. 3 illustrates a wagering module, according to an embodiment.

FIG. 3 illustrates the wagering module 122. The wagering module 122 may receive, at step 300, a prompt from the base wagering module 120. It can be noted that the wagering module 122 is triggered when the user wants to place a wager during the live event 102. For example, a user wants to place a wager of $100 on Aaron Judge of the New York Yankees, playing the 3rd inning against Clayton Kershaw of the LA Dodgers, hitting a single. The wagering module 122 may receive, at step 302, an input from the user. The input may correspond to a wager placed by the user. For example, the user places a wager of $100 on Aaron Judge of the New York Yankees, playing the 3rd inning against Clayton Kershaw of the LA Dodgers, hitting a single. Further, the wagering module 122 may compare, at step 304, the result of the live event 102 with the wagers placed by the user, to determine a result i.e. whether the user has won or lost. In this example, the wager of $100 placed for Aaron Judge hitting a single and the result of the live event 102 i.e. Aaron Judge hitting a single, are compared to determine the result of the wager i.e. a win for the user. Based on the comparison of the result of the live event 102 and the wager placed by the user, the balance amount may be calculated, at step 306, for the user. For example, the user wins the wager of $100 at +400 odds that Aaron Judge will hit a single on the next play and the result of the live event 102 is Aaron Judge hits a single. Thus, the updated balance of the user (with an opening balance of $2000), after the completion of the live event 102, will be $2000+$400=$2400. Further, the wagering module 122 may update, at step 308, the account balance of the user who place the wager, in the user database 110. In this example, after winning the wager of $100 placed at +400 odds, the updated balance of the user is $2400. Thereafter, the process returns, at step 310, to the base wagering module 120.

Figure 4:
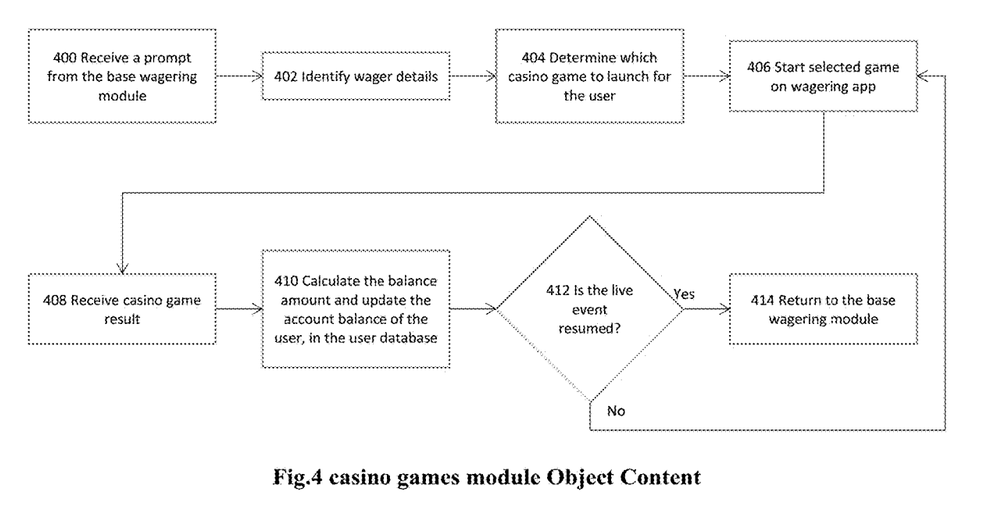
FIG. 4 illustrates a casino games module, according to an embodiment.

FIG. 4 illustrates the casino games module 124. The casino games module 124 may receive, at step 400, a prompt from the base wagering module 120. It can be noted that the casino games module 124 is triggered by the base wagering module 120, to launch a casino game from a number of casino games. Further, the casino games module 124 may identify, at step 402, wager details. The wager details may include, but are not limited to, last wager placed by the user, wager size, last play, a threshold value of the wager size, previous in-play wagers, wager frequency, time spent on each game, time since last game was played, etc. For example, a wager size of $100 is identified. Based on the identified wager details, the casino games module 124 may determine, at step 404, which casino game to launch for the user. In one embodiment, the determination of which casino game to launch for the user, may be based at least on the wager size, wager frequency, last wager, or result of user's previous wager, timing of the previous in-play wager placed by the user. In one embodiment, the casino games module 124 may launch a particular game, based on predefined threshold of the wager size. For example, in one case, if the predefined threshold is $20 and the wager size of the user is less than $20, then the casino games module 124 may offer slots to the user as it is a casino game that lends itself well to a large number of low dollar wagers. In another case, if the wager size of the user is more than $20, then the casino games module 124 may offer digital poker to the user as it is a game that can offer higher stakes per game. In another embodiment, the casino games module 124 may launch a particular game, based on the last wager placed by the user. For example, in one case, if the previous in-play wager was placed recently, then the casino games module 124 may offer blackjack to the user to attempt to continue the cadence of wagers the user has been making. In another case, if the previous in-play wager was not placed within a predefined time before the start of break, then the casino games module 124 may offer a digital poker, or, in general, a casino game whose pace is related to the pace of wagers and/or wagering history of the user, to the user based on that user's history of wagering more on digital poker than any other available casino game. In another embodiment, the casino games module 124 may launch a particular game, based on the user's wager frequency. For example, if the user has placed more than 10 wagers in last one hour, then roulette may be launched as it is a casino game that offers a large number of available wagers in a short amount of time. In another case, if the user has placed less than 10 wagers in the last one hour, then the digital poker may be launched as it provides the user with more of a sense of control over the outcome to encourage wagering in the currently stagnant user. In yet another embodiment, the casino games module 124 may launch a particular game, based on the result of user's previous wager. For example, in one case, if the user has won the previous wager, then a game of slots may be launched to give the user the immediate opportunity to win another wager. In another case, if the user has lost the previous wager, then a game of blackjack may be launched to present the user with a casino game that offers user better odds against the house in order to present the user with an option to attempt to win back their losses. In this example, when the wager size of $100 is identified as being above the wager size threshold of $20, then a game of digital poker is launched for the user. While these examples are used as single binary options, in other embodiments they can be used in combination. For example, if the user's most recent wager is above the wager size threshold, the system may then look at wager frequency and choose a casino game, such as Baccarat, due to the user's frequent high dollar value wagers and Baccarat's reputation as a game for high rollers. Based on the determined casino game to be launched for the user, the casino games module 124 may start, at step 406, the selected game on the wagering app 128. Further, the casino games module 124 may receive, at step 408, a result of the casino game. The result of the casino game may be the user has won or lost or had a tie (in case of a multiplayer game). For example, the result of the digital poker is that the user wins the hand of the pot size of $500 when the user placed an ante of $10 and further raised the bet by $40. Based on the result of the casino game, the balance amount may be calculated, at step 410, for the user. For example, the user wins the pot size of $500 played with an ante of $10 and total bet of $50. Thus, the updated balance of the user (with an opening balance of $2400), after the completion of the casino game(s), will be $2400-$50+$500=$2850. Further, the casino games module 124 will update, at step 410, the account balance of the user who places the wager in the user database 110. In this example, after winning the pot size of $500 played with an ante of $10 and total bet of $50, the updated balance of the user is $2850. Further, the casino games module 124 may constantly monitor, at step 412, if the live event 102 resumes. In one case, when the live event 102 is not resumed, then the casino games module 124 may facilitate the user to continue playing casino games. In another case, when the live event 102 is resumed, then the user may be notified and may have an option to exit the casino game, to return to the live event 102 or continue playing the casino game. In one embodiment, when the user exits the casino game to return to the live event 102, then the user's wager may stand void and thereafter, the base wagering module 120 may be triggered. Thereafter, the process returns, at step 414, to the base wagering module 120.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of delivering casino games inside of a play by play wagering game, comprising:
   receiving data from a live sporting event upon which single play wagers can be played on plays inside of that live sporting event;
   receiving two or more wagers from at least one user on a device communicatively coupled with a wagering network configured to host play by play wagering on the live sporting event;
   monitoring the live sporting event for a break in action of the live sporting event, wherein the live sporting event is monitored by at least one sensor located at the live sporting event and the at least one sensor comprises at least one of a tracking device, an RFID tag, and a GPS device embedded on or in uniforms, equipment, boundaries, fields, or markers of the live event;
   determining that there is the break in the action of the live sporting event by the at least one sensor; and
   automatically providing and displaying, on the user device, a suite of casino games during the break in action, wherein artificial intelligence suggests the suite of casino games to the at least one user based on at least one of a number of times the at least one user has played a particular casino game, a time elapsed since the particular casino game was last played by the at least one user, and a browsing history of the at least one user.

2. The method of delivering casino games inside of the play by play wagering game of claim 1, further comprising:
   triggering a casino games module based on the determination that there is the break in the action of the live sporting event.

3. The method of delivering casino games inside of the play by play wagering game of claim 1, further comprising:
   determining that the live sporting event has ended and providing at least one casino game.

4. The method of delivering casino games inside of the play by play wagering game of claim 1, further comprising:
   automatically closing a selected casino game when the at least one sensor at the live sporting event determines that the break in the live sporting event is ending.

5. The method of delivering casino games inside of the play by play wagering game of claim 4, further comprising:
   saving user progress in a selected casino game when the selected casino game is closed.

6. The method of delivering casino games inside of the play by play wagering game of claim 1, further comprising:
   notifying the at least one user when the at least one sensor at the live sporting event determines that the break in the live sporting event is ending.

7. The method of delivering casino games inside of the play by play wagering game of claim 6, further comprising:
   providing the at least one user with an option to exit a selected casino game or continue playing the selected casino game.

8. A method of providing casino game play inside of a play by play wagering platform, comprising executing on a processor, the steps of:
   displaying a wagering game on a wagering platform;
   displaying one or more real time wagers based on one or more live sporting events;
   displaying sensor data from at least one sensor located at each of the one or more live sporting events, wherein the at least one sensor comprises at least one of a tracking device, an RFID tag, and a GPS device embedded on or in uniforms, equipment, boundaries, fields, or markers of the live event;
   displaying that a break in action of the one or more live sporting events has occurred based on the sensor data; and
   displaying a suite of casino games triggered as a result of the break in action of the one or more live sporting events, wherein the suite of casino games is distinct from the one or more live sporting events and artificial intelligence suggests the suite of casino games to the at least one user based on at least one of a number of times the at least one user has played a particular casino game, a time elapsed since the particular casino game was last played by the at least one user, and a browsing history of the at least one user.

9. The method of providing casino game play inside of the play by play wagering platform of claim 8, further comprising:
   displaying a menu of casino game options.

10. The method of providing casino game play inside of the play by play wagering platform of claim 8, wherein the displayed suite of casino games are related to a wager history.

11. A method of providing games inside of the play by play wagering game, comprising:
    receiving data from a live sporting event upon which single play wagers can be placed on plays inside of that live sporting event;
    monitoring at least one user to determine that at least one user is logged into a wagering game during the live sporting event;
    receiving at least one wager from the at least one user;
    monitoring the live sporting event for a break in action of the live sporting event with at least one sensor located at the live sporting event, wherein the at least one sensor comprises at least one of a tracking device, an RFID tag, and a GPS device embedded on or in uniforms, equipment, boundaries, fields, or markers of the live event;
    determining that there is a break in the action of the live sporting event based on at least data captured by the at least one sensor; and
    providing a suite of games during the break in action, wherein the suite of games is distinct from the live sporting event upon which single play wagers can be placed on plays and artificial intelligence suggests the suite of games to the at least one user based on at least one of a number of times the at least one user has played a particular game, a time elapsed since the particular game was last played by the at least one user, and a browsing history of the at least one user.

12. The method of providing games inside of the play by play wagering game of claim 11, further comprising:
   triggering a games module based on the determination that there is the break in the action of the live sporting event.

13. The method of providing games inside of the play by play wagering game of claim 11, further comprising:
   determining which game to provide based on a wager made on action in the live sporting event prior to the break in action.

14. The method of providing games inside of the play by play wagering game of claim 11, further comprising:
   determining which game to provide based on at least one of wager history and timing of a last wager made before the break in action.

15. The method of providing games inside of the play by play wagering game of claim 11, further comprising:
   determining a game to provide based on whether or not one or more wagers were placed in a predefined time before the break in the action.

16. The method of providing games inside of the play by play wagering game of claim 11, further comprising:
   determining that the live sporting event has ended; and providing at least one game.

* * * * *